United States Patent
Burzigotti et al.

(10) Patent No.: US 9,008,233 B2
(45) Date of Patent: Apr. 14, 2015

(54) AUTOMATIC IDENTIFICATION SYSTEM RECEIVER AND SATELLITE PAYLOAD COMPRISING THE SAME

(75) Inventors: Paolo Burzigotti, Katwijk (NL); Alberto Ginesi, Noordwijk (NL)

(73) Assignee: Agence Spatiale Europeenne, Paris Cedex (FR)

( * ) Notice: Subject to any disclaimer, the term of this patent is extended or adjusted under 35 U.S.C. 154(b) by 568 days.

(21) Appl. No.: 13/503,206

(22) PCT Filed: Oct. 19, 2010

(86) PCT No.: PCT/IB2010/003043
§ 371 (c)(1),
(2), (4) Date: Jun. 28, 2012

(87) PCT Pub. No.: WO2011/048502
PCT Pub. Date: Apr. 28, 2011

(65) Prior Publication Data
US 2012/0263163 A1 Oct. 18, 2012

(30) Foreign Application Priority Data

Oct. 23, 2009 (EP) .................................. 09290817

(51) Int. Cl.
*H04L 27/00* (2006.01)
*H04B 7/185* (2006.01)
*H04L 27/20* (2006.01)
*H04L 27/233* (2006.01)

(52) U.S. Cl.
CPC ........ *H04B 7/18515* (2013.01); *H04L 27/0014* (2013.01); *H04L 27/2017* (2013.01); *H04L 27/2335* (2013.01)

(58) Field of Classification Search
CPC ........................................................ H04L 27/00
USPC .................................................. 375/316, 324
See application file for complete search history.

(56) References Cited

U.S. PATENT DOCUMENTS

| 4,084,138 | A | * | 4/1978 | Wycoff | .................. | 340/7.28 |
| 2007/0194979 | A1 | | 8/2007 | Hiraoka | | |
| 2008/0086267 | A1 | * | 4/2008 | Stolte et al. | .................. | 701/300 |

FOREIGN PATENT DOCUMENTS

WO  WO 2007/143478 A2  12/2007
WO  WO 2008/148188 A1  12/2008

OTHER PUBLICATIONS

Colavolpe, G. et al., *Noncoherent Sequence Detection of Continuous Phase Modulations*, IEEE Trans. on Comms, vol. 47, No. 6, Jun. 1999.

(Continued)

*Primary Examiner* — Jaison Joseph
(74) *Attorney, Agent, or Firm* — Alston & Bird LLP

(57) ABSTRACT

An Automatic Identification System—AIS—receiver comprising at least one processing section (PS1, PS2) for synchronizing, demodulating and detecting AIS messages contained in a received signal, said processing steps being carried out separately for a plurality of frequency sub-bands (SB1, SB2, SB3) spanning an AIS channel (CH1, CH2); the receiver being characterized in that: said sub-bands overlap with each others; and said or each processing section is adapted for synchronizing, demodulating and detecting said AIS messages within each sub-band on the basis of timing error and carrier frequency estimations obtained from filtered replicas of said received signal, propagating along respective auxiliary signal paths.

17 Claims, 9 Drawing Sheets

(56) References Cited

OTHER PUBLICATIONS

Corazza, G. E. et al., *Generalized and Average Post Detection Integration Methods for Code Acquisition*, IEEE International Symposium on Spread Spectrum Techniques and Applications (ISSSTA04), Sydney, Australia, Aug. 30-Sep. 2004.

Hicks, J. E. et al., *AIS / GMSK Receiver on FPGA Platform for Satellite Application*, Proc. of SPIE vol. 5819 (2005).

Luise, M. et al., *Carrier Frequency Recovery in All-Digital Modem for Burst-Mode Transmissions*, IEEE Transactions on communications, vol. 43, No. 2/3/4, Feb. 1995.

Mengali, U. et al., *Decomposition of M-ary CPM Signals into PAM Waveforms*, EEE Transactions on Information Theory, vol. 41, No. 5, Sep. 1995, pp. 1265-1275.

Morelli, M. et al., *Joint Frequency and Timing Recovery for MSK-Type Modulation*, IEEE Trans. on Comms, vol. 47, No. 6, Jun. 1999.

International Search Report and Written Opinion for Application No. PCT/IB2010/003043 dated Feb. 25, 2011.

Cervera, M. A. et al., *On the Performance Analysis of a Satellite-Based AIS System*, Signal Processing for Space Communications, 2008. SPSC 2008. 10$^{th}$ International Workshop, IEEE, Oct. 6, 2008, 8 pages.

Cervera, M. A. et al., *Satellite-based Vessel Automatic Identification System: A Feasibility and Performance* Analysis, International Journal of Satellite Communications, Int. J. Commun. Syst. Network (2009), 31 pages.

Naoues, M. et al., *Design of an RF-Subsampling Based Tri-Band AIS and DSC Radio Receiver*, Cognitive Radio and Advanced Spectrum Management, 2009. Cogart 2009. Second International Workshop, IEEE, May 18, 2009, pp. 64-68.

Mengali, U. et al., *Synchronization Techniques for Digital Receivers*, Plenum Press, New York, 1997.

\* cited by examiner

DM1   DM2   DM3

AUTOMATIC IDENTIFICATION SYSTEM RECEIVER AND SATELLITE PAYLOAD COMPRISING THE SAME

FIELD

The invention relates to an Automatic Identification System (AIS) receiver, particularly suited for use in a spacecraft. The invention also relates to a satellite telecommunication payload comprising such a receiver.

BACKGROUND

The Automatic Identification System (AIS) communication system was developed to provide identification and location information to sea vessels and shore stations with the aim of exchanging different type of data including position, identification, course, speed and others. On the one hand this allows vessels to anticipate and thus avoid collisions in the sea by means of a continuous traffic monitoring with several navigation aids; on the other hand AIS also offers important ship monitoring services to coastal guards or search and rescue organizations.

Each ship equipped with an AIS apparatus broadcasts information (data) in small slots of 26.67 ms. In each of these slots a message of 256 bits is transmitted at a rate of 9600 b/s using a binary GMSK (Gaussian Minimum Shift Keying) modulation over two VHF carriers. Nearby AIS emitters synchronize with each other in order to avoid packet collisions, i.e. emission of more than one packet in a same time slot by different emitters (time slots are defined globally on the basis of a common temporal reference provided by GPS). As a result Self Organized Time Division Multiplex Access (SOTDMA) regions are formed. Each SOTDMA region is designed to cope with path delays not longer than 12 bits, which translates into a maximum range of about 200 nautical miles, but typically the radio frequency coverage is limited to about 40 nautical miles. Within this range all the ships in visibility transmit with the SOTDMA protocol which ensures that collisions are prevented from bursts transmitted by different ships.

Recently, the interest of detecting and tracking ships at distances from coastlines that are larger than can be accomplished by normal terrestrial VHF communications has grown. Requirements of these long range applications such as better handling of hazardous cargo, improved security and countering illegal operations suggested a need to detect ships at very long distanced from shores.

Satellite based AIS is presented as a promising solution to overcome the terrestrial VHF coverage limitation with the potential to provide AIS detection service coverage on any given area on the Earth. In particular, a LEO (low earth orbit) constellation of small-size satellites, with an altitude ranging from 600 to 1000 km, could provide global coverage. Each satellite would be provided with an on-board small VHF antenna with a field of view spanning over a few thousands of nautical miles and comprising up to several hundreds of SOTDMA cells.

A number of projects, both of public and private initiative, are currently undergoing to analyze the concept of satellite reception of AIS signals. Some trials have also been carried out. Overall it has been proved than the new system is feasible provided efficient receiver techniques are utilized. Satellite-based AIS, however, has to face with additional technical challenges that were not considered in the original AIS standard:

AIS messages from ships belonging to different SOTDMA cells are not synchronized and therefore can collide;

Satellite motion with respect to the emitters induces a significant Doppler shift of the carrier frequency;

Signal to noise ratio ($E_b/N_0$) is lower than in terrestrial AIS; and

Relative propagation channel delay among the population of ships in visibility at any given time is much higher than in terrestrial AIS.

Document [R1] describes a space-borne AIS receiver implemented on a FPGA, based on a conventional 2-bits differential demodulator. This receiver has the advantage of simplicity, but its performances in terms of BER (bit error rate) or PER (packet error rate) as a function of signal-to-noise ratio ($E_b/N_0$) and its sensitivity to co-channel interference are not satisfactory. Performances get even worst if imperfect carrier frequency recovery and timing synchronization are considered.

Document WO 2007/143478 describes a space-based network for detection and monitoring of global maritime shipping using AIS. This document does not disclose in detail any specific AIS receiving architecture. However it suggests using Doppler frequency difference and interference cancellation to deal with the problem of colliding messages from uncoordinated AIS emitters.

SUMMARY

The invention aims at providing a receiver for detection of AIS signals from space with improved performances (particularly in terms of BER or PER as a function of signal-to-noise ratio and interference rejection), and yet a comparatively simple structure.

An object of the present invention is an Automatic Identification System—AIS—receiver comprising at least one (and preferably two, one for each AIS channel) processing section for synchronizing, demodulating and detecting AIS messages contained in a received signal, said processing steps being carried out separately for a plurality of frequency sub-bands spanning an AIS channel. Said receiver is characterized in that said sub-bands overlap with each others; and in that said or each processing section is adapted and optimized for synchronizing, demodulating and detecting said AIS messages within each sub-band on the basis of timing error and carrier frequency estimations obtained from filtered replicas of said received signal, propagating along respective auxiliary signal paths.

Another object of the present invention is a satellite telecommunication payload comprising such an Automatic Identification System receiver, said payload being adapted for receiving and detecting AIS messages generated by uncoordinated AIS emitters spread over an area having a radius greater or equal than 1,000 nautical miles.

Particular embodiments of the invention constitute the object of the dependent claims.

BRIEF DESCRIPTION OF THE DRAWINGS

Additional features and advantages of the present invention will become apparent from the subsequent description, taken in conjunction with the accompanying drawings, which show.

DETAILED DESCRIPTION

The TDMA (Time Division Multiple Acces) frame of said AIS signals is organized as described in the table below:

| | |
|---|---|
| Multiple Access Method | Self-Organised TDMA (SOTDMA) |
| TDMA frame length | 60 sec |
| Number of slots in a TDMA frame | 2250 |
| Burst structure | Training sequence: 24 bits |
| | Start flag: 8 bits |
| | Data: up to 168 bits |
| | Frame Check Sequence (FCS): 16 bits |
| | End flag: 8 bits |
| | Time Buffer: 24 bits |
| Vessels reporting rate | Between 2 sec to 6 min |
| Transmission power | 12.5 W (for "Class A" vessels only) |
| Symbol rate Rb | 9.6 kbit/s |
| Operational frequency bands | VHF with two channels (161.971 MHz and 162.025 MHz) of 25 kHz bandwidth each |

Each frame is composed by 2250 slots where the ships can transmit their bursts. Here, the expressions "burst", "message" or "packet' will be used to refer the information data that the ships transmit in the TDMA slots. The TDMA structure is repeated on the two frequency channels and each ship transmitter hops continuously between them.

Figure 1:
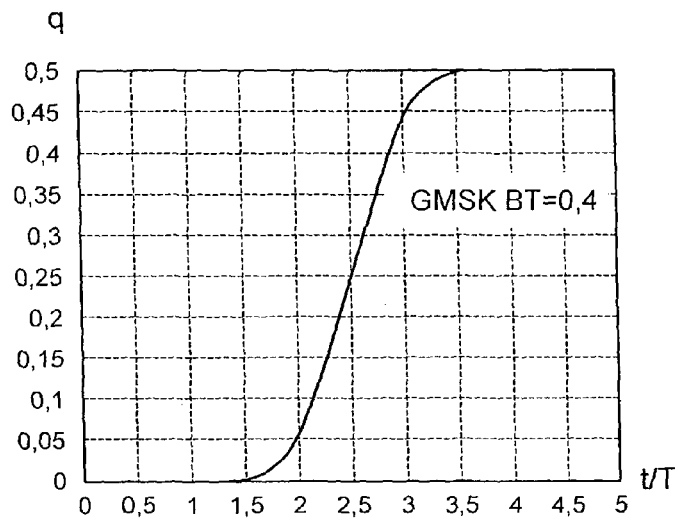
FIG. 1, the modulator phase response of an AIS signal.

The signal format consists of a binary GMSK modulation (modulation index equal to 0.5) with a BT (Bandwidth—Duration) product between 0.4 and 0.5 (nominal: 0.4):

$$s(t) = \sqrt{\frac{2E_s}{T}} e^{j\pi \Sigma_i \alpha_i q(t-iT)} \quad (1)$$

Where $E_s$ is the signal energy, T is the symbol period, $\alpha_i$ are the binary symbols assumed to be independent and identically-distributed (i.i.d.) random variables, and q(t) is the so-called "modulator phase response" which is represented in FIG. 1 for BT=0.4

Figure 2:
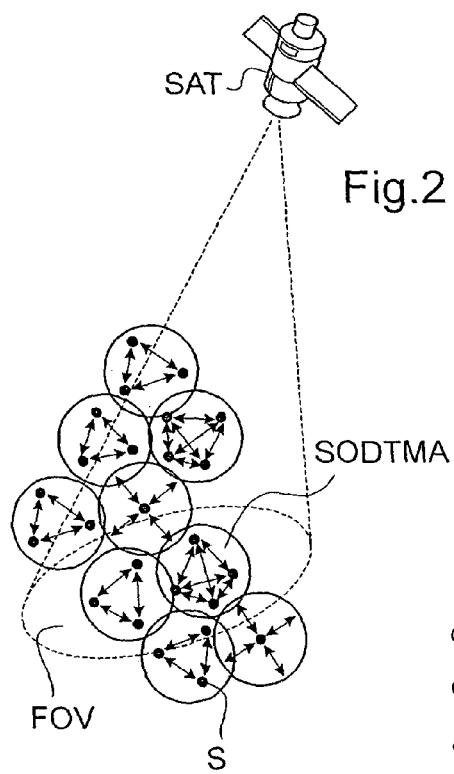
FIG. 2, a simplified representation of the concept of satellite-based detection of AIS signals.
Figure 3:
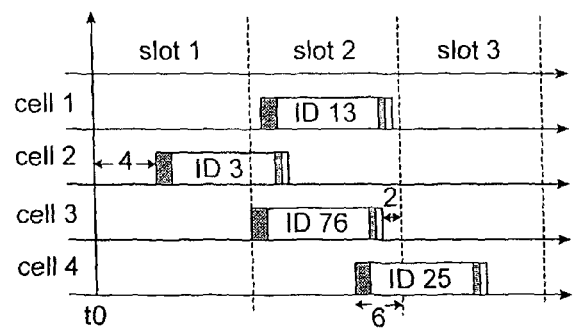
FIG. 3, a simplified representation of the burst collision issue in satellite-based detection of AIS signals.

As discussed above, satellite-based AIS has to face with additional technical challenges that were not considered in the original AIS standard. These new issues arise due to the spaceborne nature of the new system:

Messages collisions. The typical radius of a SOTDMA cell (where no message collision takes place) is around 40 nm (nautical miles). The self-organized structure is however lost when the messages received by more than one SOTDMA cell are received. This is the case of a satellite-based receiver due to the fact that the field of view (FOV) of the satellite SAT carrying the receiver covers a high number of SOTDMA regions, each comprising a plurality of ships S whose AIS emitters are coordinated among them but not with those of other SOTDMA cells (see FIG. 2). In these conditions several messages can collide within same time slot, as depicted on FIG. 3. The collisions take place with different C/I (carrier-to-interference) values as well as temporal overlaps due to the spread of received power and channel propagation delay over the satellite antenna coverage.

Path delay. The length of AIS messages was designed to face with differential propagation delays between messages from different ships up to 2 ms. Path delays among vessels and spacecraft varies, depending on the vessels location and on the maximum satellite antenna footprint. A consequence of exceeding the buffer delay is the burst overlap even between bursts transmitted in different slots of the TDMA frames. This is illustrated on FIG. 3, which represents the overlap of AIS messages, each characterized by a different emitter identifier: ID13, ID3, ID76, ID25, emitted by ships belonging to different SOTDMA cells, labeled as cell 1-cell 4. It can be seen on the figure that: message ID13 is emitted in the middle of slot 2, i.e. it begins 1 ms after the beginning of the slot, and it ends 1 ms before the end of the slot; message ID3 is emitted 4 ms after the beginning of slot 1, therefore it "overhangs" into slot 2, thus colliding with messages ID13 and ID76; message ID76 is emitted within slot 2 and is almost entirely superposed to message ID13; and message ID25 is emitted 6 ms before the beginning of slot 3, therefore it "overhangs" into slot 2 and collides with messages ID13 and ID76.

Low Signal to Noise ratios: due to higher path losses and depending on the particular satellite antenna gains, C/N (carrier-to-noise) values between 20 to 0 dB are expected. Faraday rotation also contribute to reducing the C/N level: a linearly polarized wave entering the ionosphere may have a different polarization angle when it leaves, the rotation angle depending on frequency, elevation angle, geomagnetic flux density and electron density in the ionosphere. When in the presence of a circular polarized satellite received antenna, a constant 3 dB loss is present when receiving the randomly rotated vertically polarized VHF wave as transmitted by the ship antenna.

Figure 4:
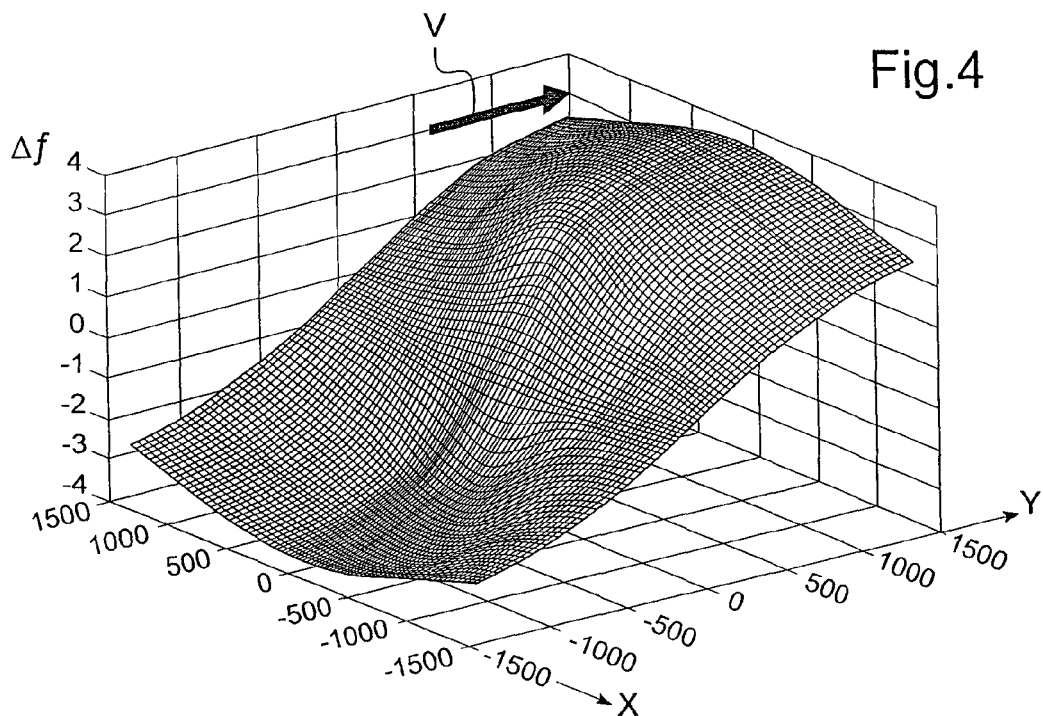
FIG. 4, a plot of the Doppler shift distribution within the coverage of a satellite AIS payload.

Doppler effect: the Doppler frequency shift is a function of relative velocity between transmitter and receiver. In the case of the satellite-based AIS system, the ship's velocity is small compared to the satellite, such that the Doppler shift can be calculated as $\Delta f = v_r/\lambda$ where $\lambda = c/f$ (=1.86 m) is the wavelength of the original AIS-signal and $v_r$ is the component of the satellite velocity directed toward the ship. $v_r$ will vary with elevation and azimuth angle from zero ($\Delta f=0$) when the ship's free line of sight to the satellite is orthogonal to the satellite's velocity vector and to maximum with the ship placed just within the satellite's local horizon and the free line of sight parallel to the to the satellite's velocity vector. For typical LEO altitudes and field of view used in AIS applications, the maximum Doppler shift is around 4 kHz. Due to the symmetry of the coverage area, the Doppler shift then varies between −4 kHz to +4 kHz with maximum relative Doppler between two messages thus of 8 kHz. FIG. 4 depicts a typical distribution of the absolute. Doppler shift when in the presence of a 600 Km altitude LEO satellite and uniform ship distribution within the coverage. In the case of the figure, the satellite velocity V is directed along the Y axis, as represented by an arrow.

Figure 5:
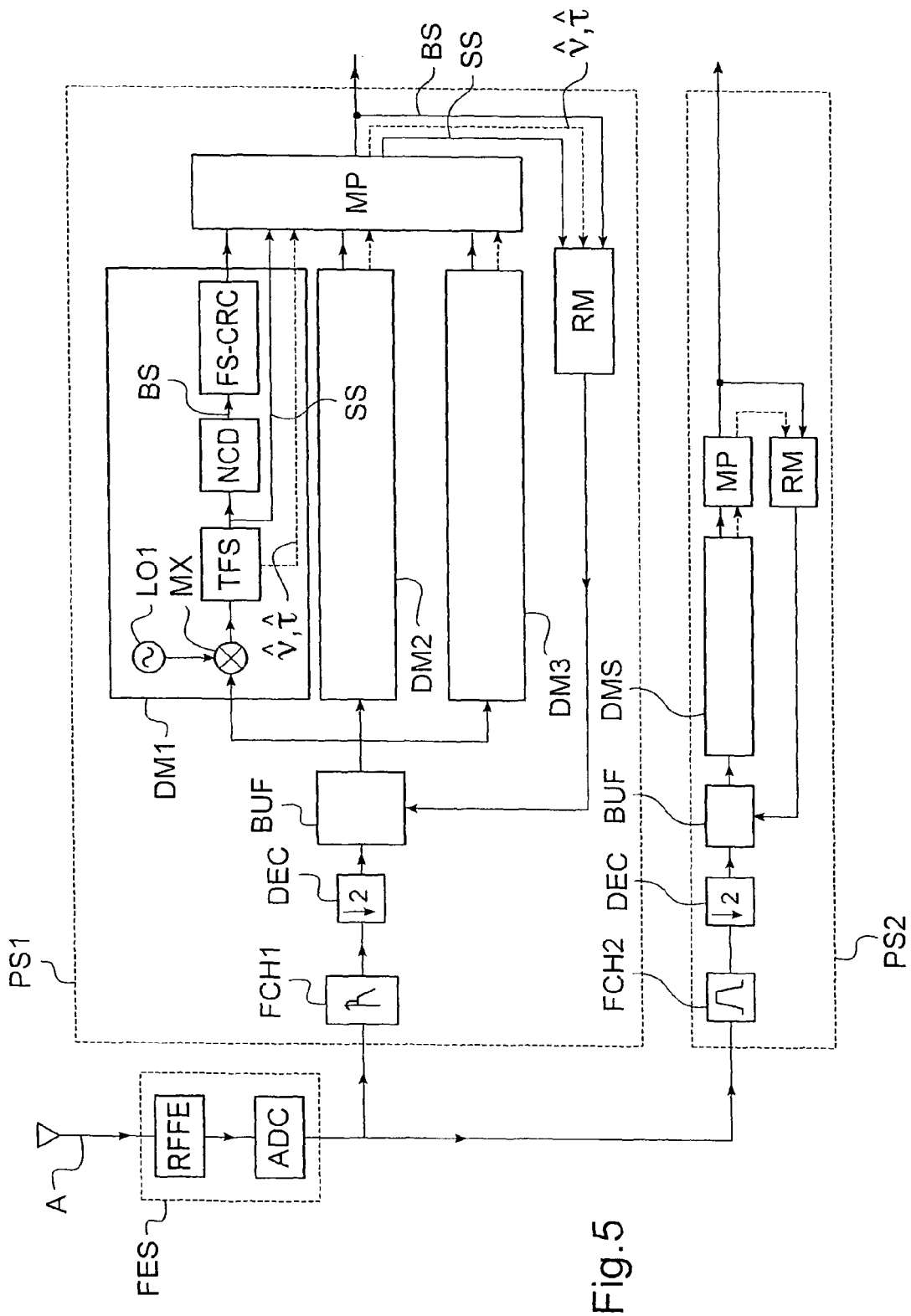
FIG. 5, a high-level block diagram of a receiver according to an embodiment of the invention.

A high-level block diagram of a space-borne AIS receiver according to the invention is reproduced on FIG. 5.

The receiver comprises a front-end section FES and two processing sections PS1 and PS2. Said sections are essentially identical, except for the fact that they operate in different channels.

The front-end section FES, directly connected to a receiving antenna A, pre-processes the signal received by said antenna before transmitting it to the processing sections PS1, PS2 which are designed to extract AIS messages from the preprocessed signal. More precisely, the front-end section FES comprises:

a radio-frequency front-end block RFFE, which performs pre-amplification, filtering and down-conversion of the raw radio-frequency signal issued by the antenna; and an analog-to-digital converter ADC, which digitizes the baseband signal issued by the radio-frequency front-end block.

The structure of the front-end section FES can be conventional.

Figure 6:
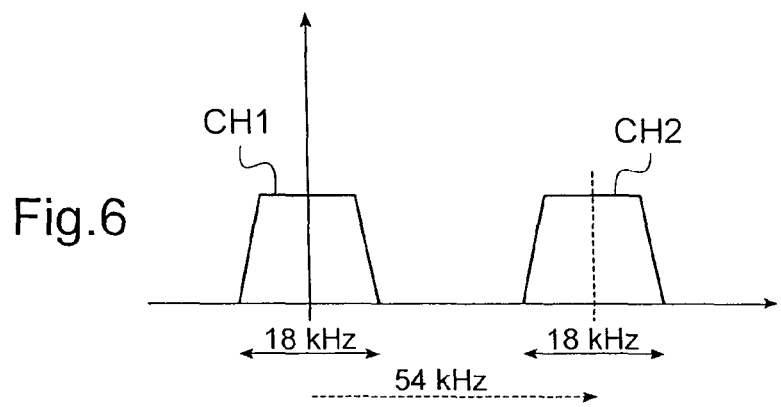
FIG. 6, the base-band AIS channels at the output of the radio-frequency front end block of the receiver of FIG. 5.

FIG. 6 represents, schematically, the spectrum of the baseband signal digitized by converter ADC. The whole AIS signal consists of two channels having a width of 18 kHz each and a separation of 54 kHz. After down-conversion, the spectrum of the first channel CH1 extends from −9 kHz to 9 kHz, while the spectrum of the second channel CH2 extends from 45 kHz to 63 kHz.

The first processing section PS1 is designed to synchronize, demodulate and detect AIS messages transmitted over the first channel, while the second processing section PS2 operates in the same way on the second channel.

Processing section PS1 comprises:

A demultiplexing low-pass filter FCH1 for isolating the first AIS channel. This filter can be e.g. a linear phase FIR (finite impulse response) digital filter.

A decimator for reducing the digital clock rate by a factor of 2 to obtain only 8 samples per information bit.

A buffer BUF to store a number of samples of the signal to be demodulated. Storing said samples, instead of sending them directly to the demodulator(s) is required in order to be able to perform interference cancellation, as it will be discussed in detail with reference to FIGS. 13 and 14. In the following, the functional description of the receiver will assume that the buffer contains an equivalent of three consecutive. TDMA slots worth of digital samples. However, it optimized implementations can be devised where less number of samples are stored in the buffer.

According to the invention, synchronization, demodulation and detection of AIS messages are carried out separately for a plurality (three, in the exemplary embodiment of FIG. 1) of frequency sub-bands spanning the first AIS channel. In the embodiment of FIG. 1, the processing section PS1 comprises a bank of three demodulators DM1, DM2 and DM3 operating in parallel on the same data, read sequentially from the input buffer, but in different sub-bands. Demodulators DM1, DM2 and DM3 operating on different sub-bands of the AIS channel are known as "zonal" demodulators.

Figure 7:
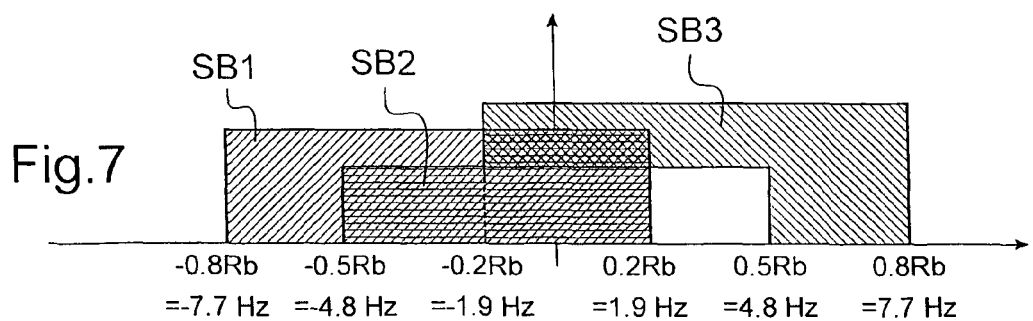
FIG. 7, the AIS-channel sub-bands partition according to a preferred embodiment of the invention.

FIG. 7 shows the subdivision of the first AIS channel into three overlapping sub-bands SB1, SB2 and SB3, each of bandwidth equivalent to the signal bit rate Rb, and staggered by 0.3 Rb. Each zonal demodulator processes one slice of the AIS channel, i.e. one sub-band.

The use of "zonal demodulators" allows exploitation of the frequency diversity given by the Doppler spread. Let consider, for example, two ships having a wide spatial separation, and therefore belonging to different SOTDMA cells; the AIS emitters carried by said ships are uncoordinated, and can transmit an AIS message in the same time slot. But in many cases, the spatial separation of the ships will translate in a different Doppler shift of the AIS messages, allowing their detection despite their temporal overlap.

Each sub-band has to be large enough to ensure a proper estimation of the AIS message timing and of it carrier frequency, which is essential for demodulation. The target precision is driven by the maximum tolerable residual carrier and timing offset. The maximum acceptable bandwidth is such to let the signal pass without distortion (bandwidth greater or equal than Rb), plus the margin to take into account the maximum Doppler shift of 4 kHz≈0.45 Rb; a broader bandwidth would only pick-up additional noise. The minimum is driven by the target precision of the frequency and time estimation: the narrower is the sub-band the higher is the interference rejection (intra-system, i.e. due to other colliding AIS messages, as well as and inter-system, i.e. due to sources external to the AIS system) but also the higher is the signal distortion. As it will be shown hereafter, partial signal distortion is allowed without resulting in any important estimation degradation.

The sub-bands SB1-SB3 are intentionally overlapped by design. This is counterintuitive, because as a result a grater number of zonal demodulators is required (three instead of two in the example of FIG. 7). However, sub-band overlapping ensures that even a signal with maximum Doppler shift can be correctly recovered. Indeed, a signal which is Doppler-shifted to the edge of one sub-band will be completely inside the adjacent sub-band, without distortion. Without sub-band overlapping, such a signal would be strongly distorted by the "zonal filters" delimiting the different sub-bands and its recovery would be either impossible or its precision jeopardized.

The sub-band overlap has to be significant in order to ensure the correct estimation of frequency and timing. For example, the message should be within a sub-band with a tolerance of 0.15 Rb; this leads to a maximum distance between the center of the sub-bands of 0.3 dB (these figures, however, are implementation-dependent). In an exemplary embodiment of the invention, the overlap between two adjacent sub-bands is equal to Rb-0.3.

Optimization of the number of bands and bandwidth are possible. Optimally, each band should have a bandwidth equivalent to the signal bit rate Rb (with an implementation-dependent tolerance of e.g. ±5%): this solution allows for a correct estimation of frequency and timing within the target figure. Narrower bandwidth would further reject the interference without improving the estimation precision.

Each bandwidth should also allow for a tolerance of frequency shift, i.e. of 0.15 Rb. Some performance degradation with respect to the nominal case is observed but still within the target figure. The distance between the centers of two adjacent sub-bands can then be set at 0.3 Rb (again, with a tolerance of e.g. ±5%): only 3 bands are then necessary to cope with the maximum Doppler shift of 0.45 Rb. This optimal solution is illustrated on FIG. 7.

As mentioned before, estimation of the timing error and of the carrier frequency of AIS messages is necessary to their demodulation. It will be explained further how these estimations can be obtained in a receiver of the invention. What has to be underlined at this point is that timing estimations $\hat{\tau}$ and carrier frequency estimations $\hat{\upsilon}$ are not only used within each zonal demodulator DM1-DM3, but they are also provided at the output of said demodulator, as illustrated on FIG. 5.

Given the overlap between the AIS-channel sub-bands, it might occur that the same message is successfully decoded by more than one zonal demodulator. For this reason, the outputs of the three zonal demodulators (i.e. the detected messages BS together with the corresponding synchronized signal SS as well as timing error and carrier frequency estimations $\hat{\tau}, \hat{\upsilon}$) are inputted to a message parser block MP which is in charge of discarding duplicated messages. More precisely, if several replicas of a same AIS message are present at the input of the message parser MP, the latter retains the parameters $\hat{\tau}, \hat{\upsilon}$ which have been estimated with the greatest precision.

For each successfully decoded message at the output of the message parser, the baseband message at the buffer is digitally reconstructed by re-modulating the decoded bits in a re-modulating block RM. The re-modulated signal is then subtracted from the data samples stored in the input buffer BUF, thus performing interference cancellation. After interference cancellation, demodulation is performed again. These steps are repeated until no more messages can be decoded out of these samples. At that point, a number of samples equivalent to a TDMA slot are pushed from the decimator into the buffer while the "oldest" samples belonging to the first TDMA slots are cancelled. The detection process then resumes with the new set of three slots.

Figure 13:
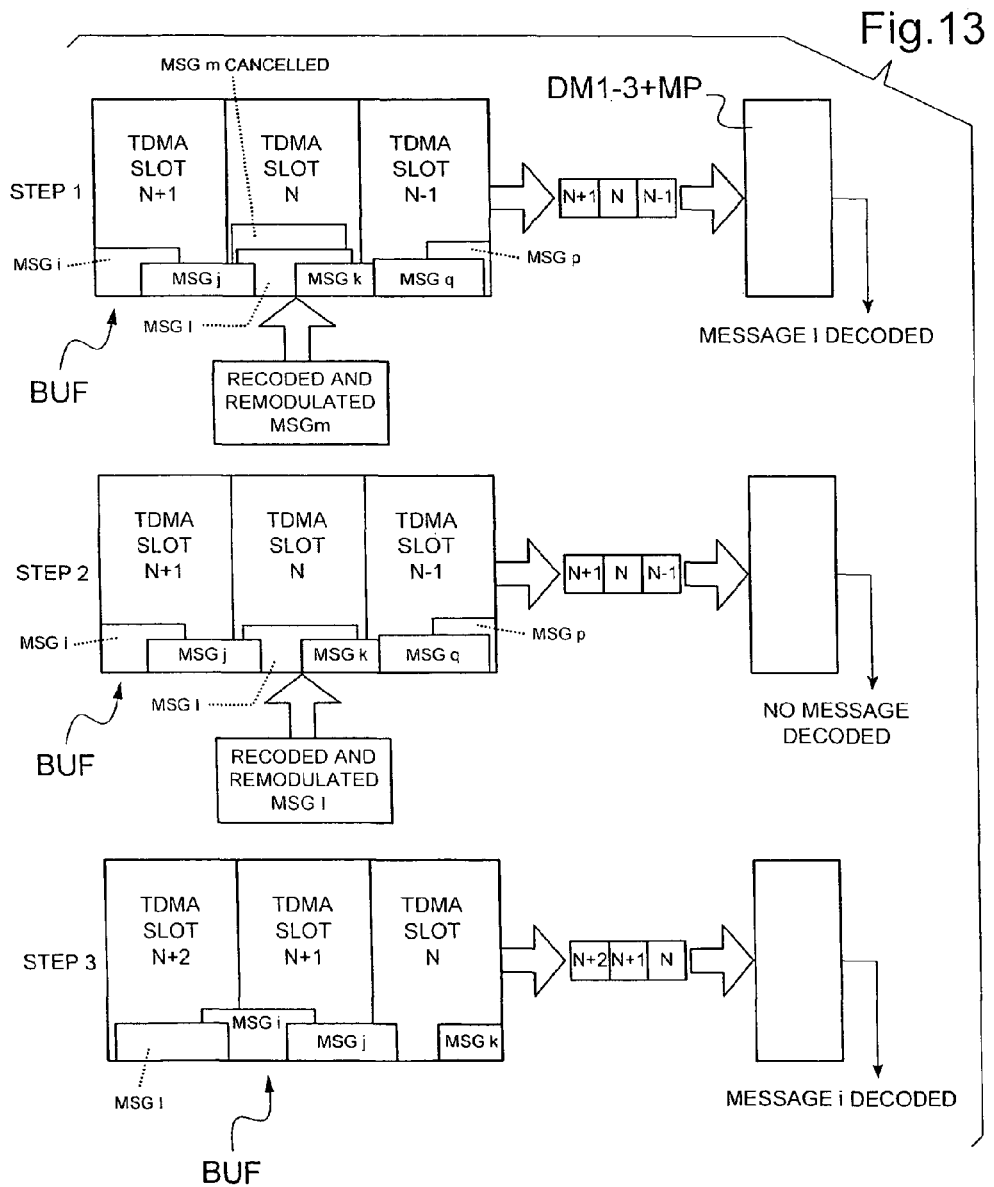
FIG. 13, a schematic representation of interference cancellation in the receiver of FIG. 5.

The whole interference cancellation process is illustrated on FIG. 13. This figure represents a buffer BUF storing a set of samples representing several partially overlapping AIS messages (i, j, k, l, m, p, q) spanning three time slots: N−1, N, N+1. The height of the rectangles representing messages is indicative of the respective signal strength. At STEP 1, the decoded and re-modulated message "m" is subtracted from the set of samples stored in the buffer. Then, said samples are transmitted to the three "zonal demodulators"; thanks to the subtraction of message "m", message "l" can then be decoded. Subtraction of re-modulated message "l", however, does not allow recovering of any additional messages (messages "j", "k" and "q" are still severely affected by collisions; messages "i" and "p" are not fully contained within the buffer). Then, the "oldest" samples, i.e. those contained within slot N−1 are discarded; slots N and N+1 are shifted to the right and samples corresponding to a new slot N+2 are loaded into the buffer. Now (STEP 3) message "i" is fully contained within the buffer, and can be decoded with a high probability of success (it is partially superposed with messages "j" and "s", but it is assumed that discrimination is possible thanks to Doppler diversity and signal power unbalance), and so on.

It should be noted that, despite interference cancellation and exploitation of Doppler diversity, some AIS messages ("k", "p" and "q") cannot be retrieved. However, satisfactory monitoring of the maritime traffic can be achieved despite some losses, provided that the loss rate is sufficiently low. In typical applications, at least one message per ship per 3 hours should be retrieved.

The second processing section PS2 of the receiver, dedicated to the second AIS channel CH2 can have the same architecture of the first processing section. In the example of FIG. 5, however, it has been chosen to use an alternative architecture wherein the three "zonal demodulators" DM1-DM3 operating in parallel is replaced by a single demodulator DMS configured for operating successively in all the sub-bands of channel CH2. Fewer elements are required for this implementation of the demodulator, but they will have to operate at a higher frequency. A complete receiver can use "parallel" demodulators for both channels, or "serial" demodulators for both channels, or one "parallel" and on "serial" demodulator. Particularly if the channels are subdivided in more than three sub-bands, it is also possible to use a "hybrid" architecture, with several "serial" demodulators are used in parallel, each of said demodulators operating in several sub-bands.

The internal structure of one zonal demodulator, DM1, will now be described with additional detail. The internal structure of "companion" demodulators DM2, DM3 can be substantially identical; that of the serial demodulator DMS can be similar, with modifications related to its serial mode of operating.

Demodulator DM1 comprises:
  A local oscillator LO1 generating a signal at 2.9 kHz, i.e. at the central frequency of sub-band SB1;
  A mixer MX, mixing the signal entering the demodulator with the signal generated by the local oscillator LO1, in order to shift the central frequency of sub-band SB1 to 0 Hz;
  A synchronization block TFS for estimating the timing error $\tau$ and the carrier frequency $\upsilon$ of AIS signals, and for "synchronizing" said signals;
  A detection block NCD for detecting AIS messages, i.e. retrieving the corresponding bit sequence;
  A frame synchronization block FS-CRC for determining the timing of a TDMA frame of a detected AIS message, i.e. for determining the start point of said TDMA frame. The frame synchronization block also performs cyclic redundancy check (CRC) to detect errors in the recovered message.

Hereafter, the internal structures of the TFS, NCD, FS-CRC blocks of the receiver, as well as of the message parser MP and of the re-modulating block RM will be described in detail.

Figure 8:
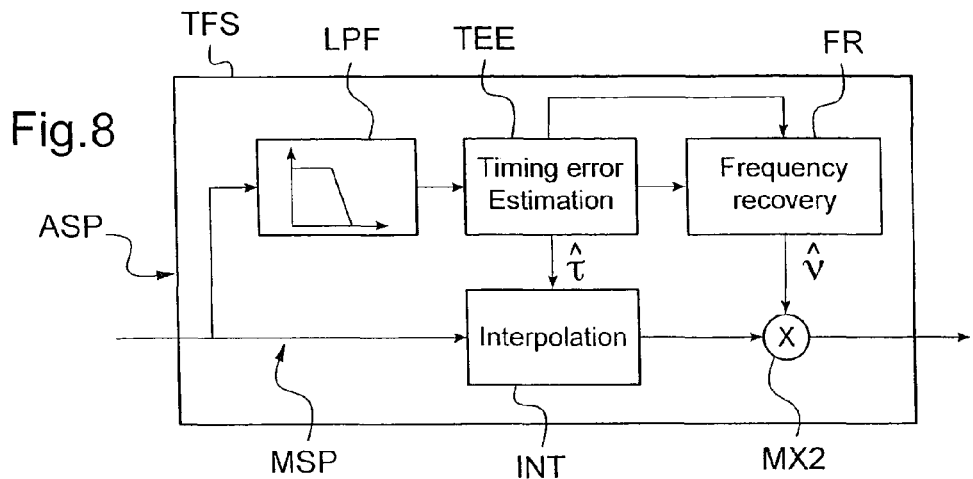
FIG. 8, a schematic diagram of the synchronization block of the receiver of FIG. 5.

A block diagram of the TFS component of the zonal demodulator is shown on FIG. 8. The data signal has to be corrected by timing and carrier frequency compensations before being fed to the following NCSD block. To this end, an estimate of the correct signal timing epoch $\hat{\tau}$ as well as of the carrier frequency $\hat{\upsilon}$ have to be derived.

A synchronization block TFS according to the invention comprises both a main signal path MSP and an auxiliary signal path ASP, fed by the same data (output of mixer MX). The auxiliary data path is used to derive the timing error and carrier frequency estimations; said estimations allow synchronization of the signal propagating along the main path.

The auxiliary signal path comprises a low-pass filter LPF, a timing error estimation block TEE and a frequency recovery block FR.

The low-pass filter LPF extract, from the input signal, the spectral components falling within the first sub-band SB1: it acts as a zonal demodulator demultiplexing filter. It is worth noting that such a filter is only provided on the auxiliary data path, and not on the main data path. This choice has been derived from the experimental observation that the synchronization algorithms are less sensitive to signal distortions due to low-pass filtering than the performance of the decoding block NCD. This allows using a narrower filter for better eliminating the interferences and then improving the estimation. The LPF filter can be e.g. a 120 taps FIR filter with Bandwidth=Rb.

Timing and carrier frequency estimation are carried out over a window of only $L_0=128$ symbols (bits) belonging to the TDMA slot in the middle of the buffer. The reason for this is that the current message time-alignment is not know at this point, so the synchronization blocks have to be activated on the portion of the slot where messages transmitted in that slots would have energy. It turns out that, given the max differential delay between messages in the coverage, only $L_0=128$ symbols of the slot can be used.

Time recovery is needed at this stage because the following frequency recovery takes advantage of the optimum sampling time. In a preferred embodiment of the invention, timing error and carrier frequency recovery are performed by applying the method described in document [R3]. AIS signals have GMSK modulation with a modulation index equal to 0.5 and a BT (Bandwidth—Duration) product between 0.4 and 0.5. Here, the case BT=0.4 will be considered, but it has been verified that the synchronization algorithm is practically insensitive to the actual value of BT provided it is in the range [0.3-0.5].

Following document [R3] the estimated timing error $\hat{\tau}$ is given by:

$$\hat{\tau} = -\frac{T}{2\pi} \arg \left\{ \sum_{i=0}^{N-1} \left[ \sum_{m=1}^{M} A_1(m) |\hat{R}_m(i)| \right] e^{-j2\pi i/N} \right\}$$

where:

$$\hat{R}_m(i) = \frac{1}{L_0 - m} \sum_{k=m}^{L_0-1} [x_k(i) x_{k-m}^*(i)]^2$$

$x_k$ are the samples of the signal at the output of the low-pass filter;

$L_0$ is the observation window, i.e. the number of bits used for performing the estimation; in the exemplary embodiment of the invention, $L_0=128$;

M is the number of calculated autocorrelation within $L_o$ (design parameter)

N is the up-sampling factor (8 in the exemplary embodiment considered here);

and $A_i(m)$ are the Fourier coefficients of $|g_m(t)|$ where $g_m(t)=E\{\exp\{2j[\psi(t,\alpha)-\psi(t-mT,\alpha)]\}\}$, where:

$\psi(t,\alpha)=\pi\Sigma\alpha_i q(t-iT)$, $\alpha_i$ being independent data symbols taking on the values ±1, T being the symbol period and q(t) the phase pulse of the modulator;

E is the expected value operator, "*" indicates complex conjugation and j is the imaginary unit.

Figure 9A:
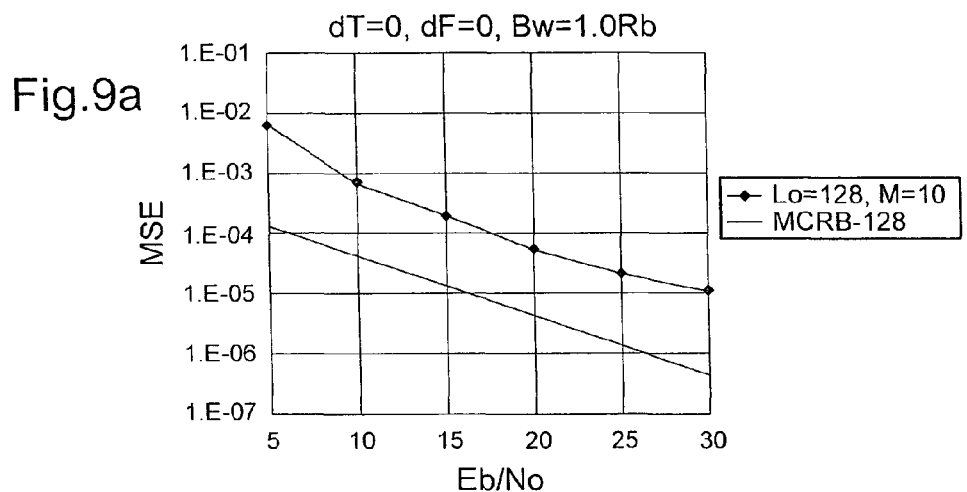
FIGS. 9A, 9B and 9C plots illustrating the stand-alone performances of the synchronization block of FIG. 8, i.e. the performances of the block considered independently from other elements of the receiver.

FIG. 9A reports the resulting normalized timing mean square error as function of the $E_b/N_0$, compared to corresponding modified Cramer-Rao bound, in AWGN (Additive White Gaussian Noise) channel. Based on this performance it is reasonable to expect that reasonably accurate timing estimates can be retrieved down to $E_b/N_0 \cong 5$ dB, as that corresponds to a timing error standard deviation of about 0.1/Rb which is considered low enough for a binary modulated signal.

The timing epoch estimate derived by the TEE block is used to properly re-sample the signal propagating along the main signal path through cubic interpolation (interpolating block INT).

The frequency recovery block FR uses the signal re-sampled in time to the optimum instant (clock aided scheme) and derives the carrier frequency estimation based on a feedforward structure implementing the equation:

$$\upsilon = \frac{1}{4\pi MT} \sum_{m=1}^{M} \arg\{\mu_m R_m(\bar{t}_m) R_m^*(\bar{t}_{m-1})\}$$

where: $\mu_m=1$ if $g_m(\eta_m T) g_{m-1}(\eta_{m-1} T) > 0$ and $\mu_m=-1$ otherwise, where $\eta_m 0$ if $A_1(m) > 0$ and $\eta_m = \frac{1}{2}$ otherwise. For more details, refer to [R3].

Figure 9B:
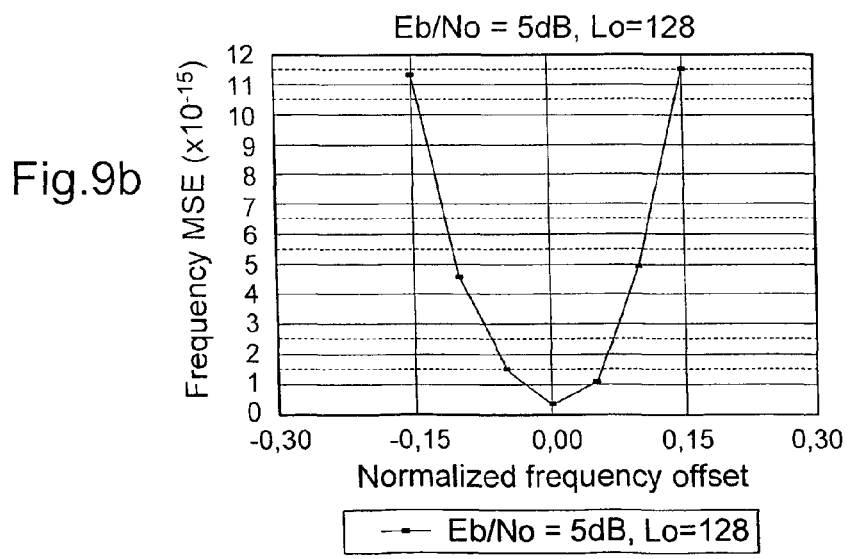
Figure 9C:
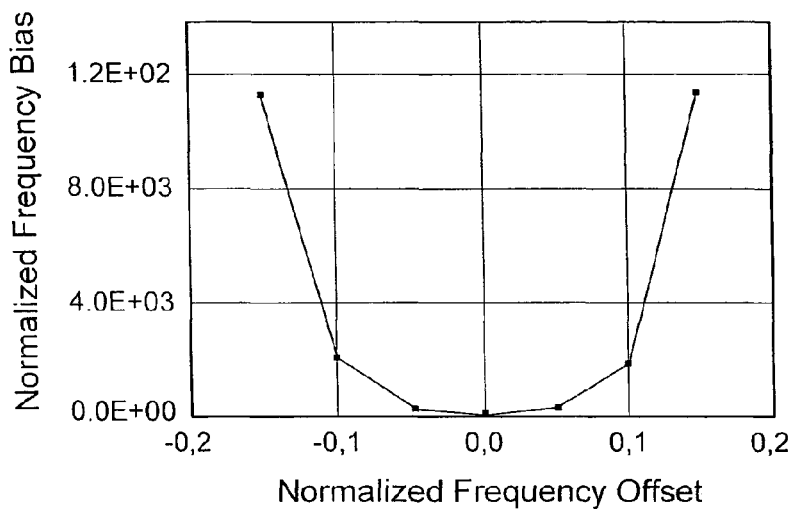

The performance frequency estimation algorithm in an AWGN (Additive White Gaussian Noise) channel with $E_b/N_0=5$ dB is depicted in FIGS. 9B and 9C in terms of the normalized mean square error MES (FIG. 9B) and bias (FIG. 9C) of the provided frequency estimates for different values of the carrier frequency. Assuming a Gaussian distributed frequency error with standard deviation $\sigma$, it turns out that a maximum frequency error at $3\sigma$; i.e., bias+$3\sigma$ is guaranteed for $E_b/N_0=5$ dB almost within the entire target range [−0.15 0.15] Rb.

It is also important to characterize the performance of the frequency recovery scheme when in the presence of interference(s) with a variable frequency offset, as it is anticipated that that would noticeably degrade the precision of the frequency estimation of the AIS signal to be demodulated. The performances have been checked against different values of frequency offset $dF_{sig}$ of the target signal, frequency offset $dF_{int}$ and power of the interfering signal.

Figure 15:
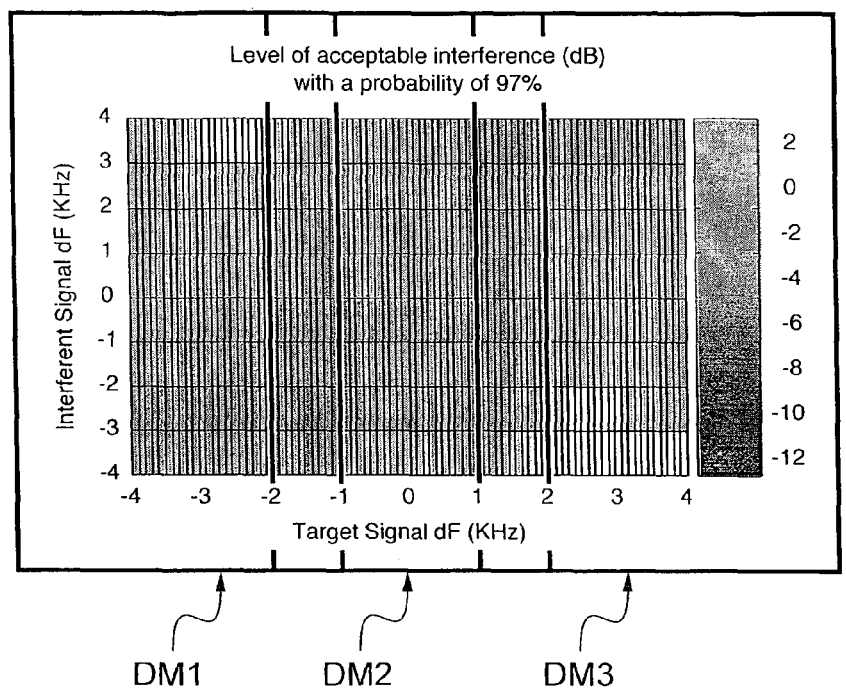
FIG. 15, a plot characterizing the performance of a frequency recovery scheme used in the synchronization block of FIG. 8 in the presence of interferences.

For each couple $\{dF_{sig}, dF_{int}\}$ it is possible to derive the maximum tolerable power of the interfering signal which guarantees to have a maximum normalized residual frequency error $dF_{residual} < 0.02$, considering both the introduced bias and MSE (this figure is driven by the decoder). The results are then reported in FIG. 15 for the three zonal-demodulators of the receiver of FIG. 5. For $dF_{sig}$ frequency shift such that two zonal-demodulator are overlapping and the target signal can be detected by both the demodulators, the maximum tolerable power of the interfering signal is computed as the maximum of the two possible values.

The estimated carrier frequency $\hat{\upsilon}$ is mixed by mixer MX2 with the signal propagating along the main path in order to center the spectrum of the AIS signal to be detected around 0 Hz.

The "synchronized", but not filtered, signal SS exiting the TFS block is then processed by the detection block NCD which extracts a bit sequence BS corresponding to the demodulated AIS message. Signal SS is also propagated to the message parser MP, as it is required for re-modulation and interference cancellation.

In a preferred embodiment of the invention, the detection block NCD implements the non-coherent detection scheme described by document [R2]. This scheme is preferred due to the following features i) Excellent BER performance, i.e. very close to the ideal Coherent Maximum Likelihood detector performance;

ii) insensitivity to carrier phase: with other detection schemes, due to the short length of the AIS messages, the precision of phase recovery schemes could significantly degrade the detector BER performance; and iii) high resilience with respect to carrier frequency offsets.

Figure 10:
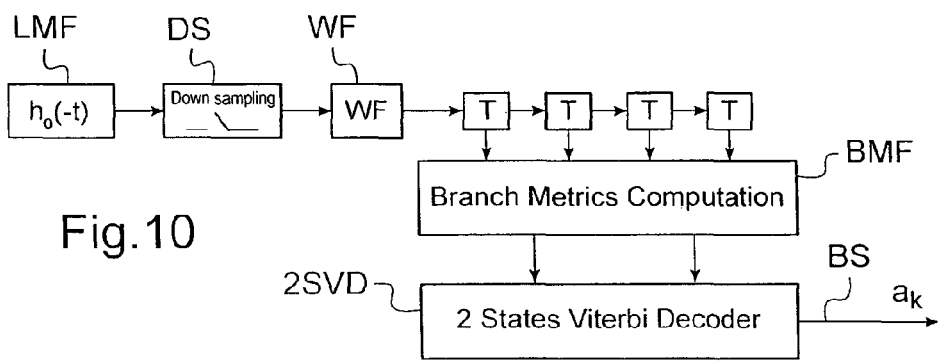
FIG. 10, a schematic diagram of the detection block of the receiver of FIG. 5.

A block diagram of the NCD block is illustrated on FIG. 10.

The input signal, i.e. the output of the TFS block at 8 samples per bit is first filtered by a filter LMF matched to the first component of the Laurent's expansion (see document [R5]) of the GMSK signal. According to this expansion any Continuous Phase Modulated (CPM) signal, as GMSK, can be expanded into a series of Q-PAM (quadrature pulse amplitude modulation) signals:

$$s(t, \overline{\alpha}) = e^{j2h\pi\Sigma_i \alpha_i q(t-iT)} = \sum_{k=0}^{Q-1} \sum_i b_{k,n} c_k(t-iT)$$

Where $c_k(t)$ are the so-called Laurent's pulses (a function of the modulation index h and the CPM phase pulse q(t)) and $b_{k,n}$ are the pseudo-symbols. For the principle pulse (k=0) the pseudo symbols take on the expression:

$$b_{0,n} = e^{jh\pi\Sigma_{i=-\infty}^{n} \alpha_i}$$

In turns out that for a GMSK signal with BT=0.4 most of the energy is within the first pulse and thus the signal can be fairly well approximated by the first PAM component. The output of the Laurent Matched Filter (LMF) is down sampled (down-sampling block DS) to one sample per symbol (bit) and fed to a Withering Filter (WF) whose purpose is to whiten the AWGN noise that has been shaped by the LMF. This filter can be e.g. a five-tap FIR filter. A two-state Viterbi 2SVD decoder then follows the WF and based on the output of four memory cells (N=4).

Figure 11:
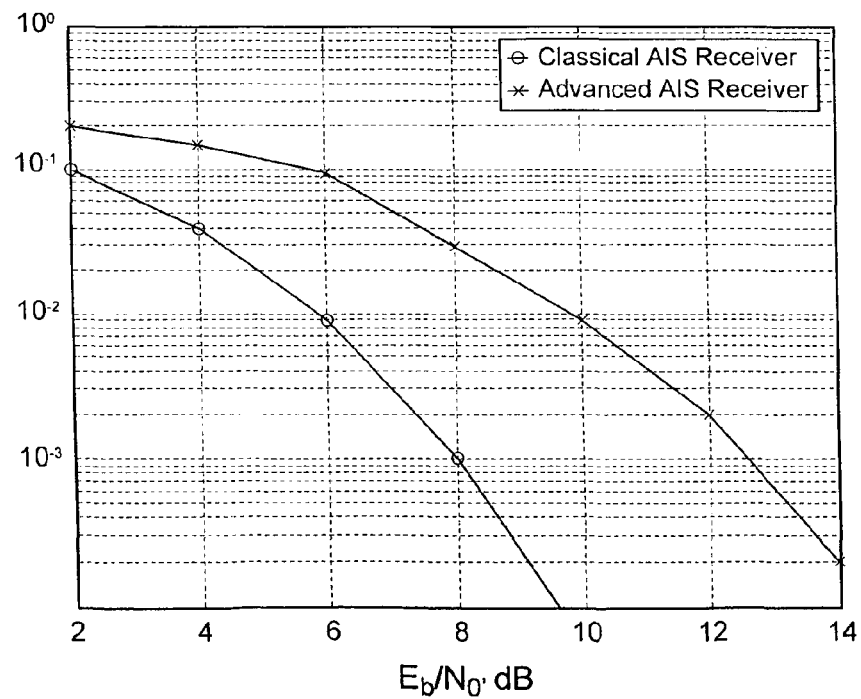
FIG. 11, a plot illustrating the performances of the detection block of FIG. 10 and their comparison with that of a conventional 2-bits differential demodulator.

The performances of the NCD block and of a <<classical>> 2-bit AIS differential detector (see document [R1]) over an AWGN channel, in terms of BER as a function of $E_b/N_0$, are reported on FIG. 11. It can be seen that the non-coherent detection scheme provides a gain of up to 5 dB in signal-to-noise ratio. The BER performances of the NCD block increase with the number of memory cells of the Viterbi decoder, but N=4 turns out to be a good compromise between performances and complexity.

Also of interest is the performance of the NCSD block with respect to interference rejection. Simulations have shown that decoding of collision-affected pulses with a relatively low signal to interference power is till possible provided the signal-to-noise ratio is high enough. For example, $E_b/N_0$ of at least 18 dB guarantees a BER less than $10^{-2}$ when one interference only is present, and thus a PER (Packet Error Rate) less than 1, enabling ship message detection after a number of transmissions. For example, if the PER is 0.9, after 20 received messages from the same ship, the overall ship message detection probability is $0.9^{20}$ i.e. about 0.12. It has been found that, for a given C/I, the performance worsens with the number of interferences. This was expected as when the number of interferences grows, the interference distribution tends to widen becoming Gaussian, thus impacting more the performance. As expected, when the interference is offset in frequency with respect to the main message, the BER performance improves notably (+1 dB for a 5 kHz offset). This is due to the interference rejection capability of the NCD block.

Figure 12:
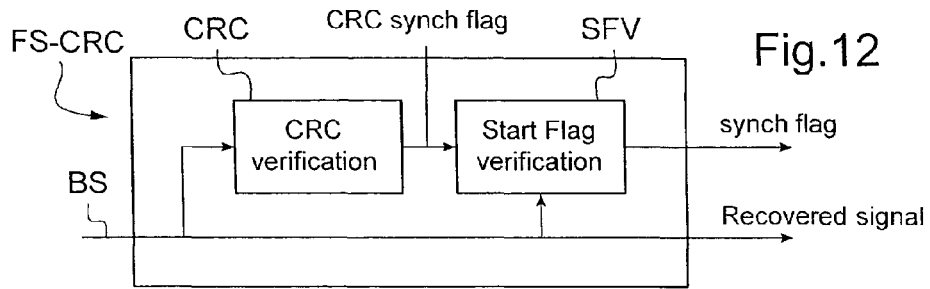
FIG. 12, a schematic diagram of the frame synchronizing block of the receiver of FIG. 5.

FIG. 12 illustrates the block diagram of the frame synchronization block FS-CRC. Starting from the consideration that frame synchronization based only on the Start of Flag field of the AIS message may not be reliable enough in interference-limited systems as all the messages use the same Start of Flag (SoF) field, the alignment to the start of the message is achieved by computing the CRC for the 128 possible positions of the start of the message (CRC bloc). Several positions can satisfy the CRC condition; therefore, in order to lower the probability of False Alarms down to an acceptable value, a Start of Flag verification (SFV block) is also performed for each of said positions (SoF verification can be performed over the whole 8-bit SoF field or over a part of it: this is a design decision based on a trade-off between False Alarm and Missed acquisition). When the right position is found the CRC is verified, the search is stopped and the successfully decoded message is passed on to the message parser block. In order to lower the probability of False Alarms down to an acceptable value, a Start of Flag verification (SFV block) is also performed.

In the simplest possible embodiment, the message parser MP only compares messages and, when it detects a repetition, randomly discards one of the replicas. This cannot ensure that the best estimation for timing and frequency are retained.

In a more refined embodiment, the Message Parser evaluates the quality of the estimation by taking into accounts the reliability of the metrics from the decoding block NCD. Reliability information is provided by the decoding block itself.

Additionally, the best quality estimation can be chosen as that performed by the sub-band module whose sub-band center is nearest to the central frequency of the message. For example, if a message centered on 0.1 Rb is detected by both DM1 (whose sub-band is centered on +0.3 Rb) and DM2 (whose sub-band is centered on 0.0 Rb) it is likely that the best estimation will be the one provided by DM2.

The signal re-modulator RM is a rather complex element of the receiver of FIG. 5. Its internal structure is depicted on FIG. 14.

The input signals of the re-modulator RM are:

the same soft-bit input BS as for the Non-Coherent Sequence Detection input but with timing and fine frequency correction already performed; in particular the signal is derived from the zonal-demodulator which succeeded in the decoding; and the sucessfully decoded message BS.

Prior to re-modulation proper, the re-modulator RM performs a refinement of the Frequency, Phase and Amplitude estimation based on knowledge of the received signal (data-aided algorithms); this additional step of refining estimates is required to make interference cancellation (IC) really effective in improving the performances of the AIS signal detector. Residual frequency error up to 0.02/Rb and time alignment error up to ⅛ Rb are considered. The estimation algorithms are based on the Maximum-likelihood approach. The decoded message coming from the parser of the zonal-demodulators is then digitally re-modulated and fed-back to be cancelled from the receiver input.

The soft-bit signal SS received from the zonal-demodulator is needed to improve the estimation of signal parameters. The estimates are then used by the digital modulator to generate a copy of the signal properly frequency-, timing- and phase-shifted to be subtracted off the composite signal received in the TDMA slot under analysis.

Figure 14:
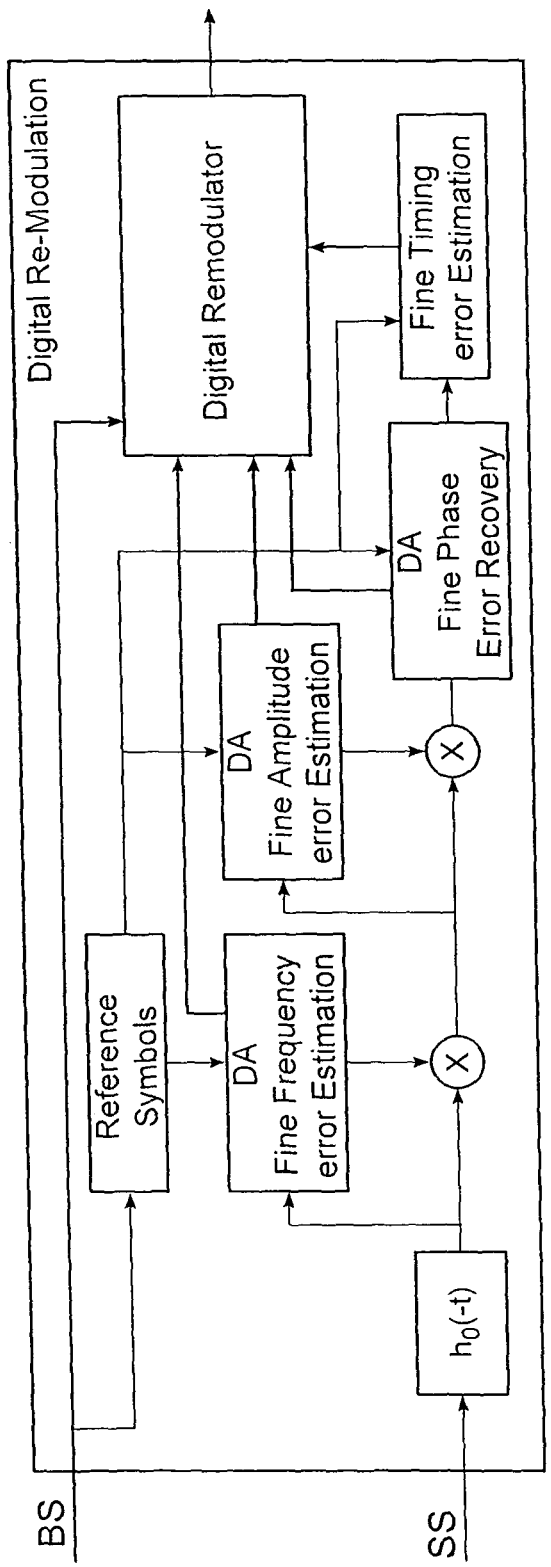
FIG. 14, a schematic diagram of the re-modulating block of the receiver of FIG. 5.

Following the diagram of FIG. 14, the bit-data message received BS from the parser of the zonal-demodulators is used to generate the Reference Symbols sequence exploited by the following Data Aided estimation algorithms. The generation is based on the Laurent decomposition:

$$a_{0,n} = \exp\left(jh\pi \sum_{m=-\infty}^{n} \alpha_m\right)$$

where $\alpha_m$ represents the decoded bits properly mapped to M-ary symbol of the alphabet and the $a_{0,n}$ sequence represents the pseudo-symbols after the Laurent decomposition (see [R5]) when only the first component is considered.

The signal received from the zonal-demodulators is firstly filtered thanks a filter matched to the first component of Laurent (on FIG. 14, filtering is implemented by the convolution block $h_0(-t)$, $h_0$ being the impulse response of the filter). The scope of this filter is twofold, both to cancel out the noise plus interference lying outside the signal bandwidth and to extract the first Laurent component according to the decomposition as in 0. The implementation of a low pass filter matching the first order Laurent's response results in a large inter-symbol interference; however it will be shown in the following that the performances are not compromise and the degradation is not appreciable.

In this implementation the small frequency and epoch timing error as affecting the input signal are not yet corrected; however it is assumed that the overall performances are not affected.

The output of this block, properly aligned in time to consider the latency of the filter, is then down-sampled at one sample per symbol.

The filtered signal, one sample per symbol, is then processed with the devised data-aided frequency recovery algorithm to estimate the residual frequency error v (DA Fine-Frequency Error Estimation block). In particular a feed-forward data-aided and clock-aided carrier frequency recovery estimation has been adopted as addressed in document [R4].

In the following a correct signal timing epoch is assumed, however extensive tests have been performed to verify the non-sensitivity of the algorithm to the maximum residual timing error as from the zonal-demodulators.

Firstly the modulation is wiped out by multiplying the signal by the complex-conjugated reference symbols sequence $\{a_{0,k}\}$ properly time-aligned. Indeed, in absence of inter-symbol and inter-system interference, this would lead to $\{|a_{0,k}|^2\}=\{1\}$, leading to a discrete-time sinusoid with frequency v.

Second step is the estimation of the frequency v. This scope can be pursued thanks to a variety of algorithms leading to different implementation of the same solution. In this embodiment, the Luise & Reggiannini algorithm described in document [R6] has been chosen for its performances close to the MCRB (Modified Cramer-Rao Bound) and the low level of complexity without loosing in generality.

In order to minimize the impact on the following data-aided amplitude and phase estimations and to allow a more performing interference cancellation, a refinement of the estimate through a double recovery strategy can be adopted to reduce further the residual frequency error.

The input signal second stage of the frequency estimator is characterized by a maximum error identified in the previous section where an observation window of $L_0=80$ symbols has been considered. Thus, the second stage can work on a wider observation window up to the maximum value of $L_0=250$ symbols.

It is possible to derive analytically the limit performance by considering that $MSE \propto 1/L_0^3$, according to the MCRB mathematical expression. Under this assumption, the residual frequency error is lowered down to $6 \cdot 10^{-4}$ with a probability lower then 99.9%, according to:

$$\begin{cases} MSE_{L_0=80} \cong 27 \cdot MSE_{L_0=250} \\ \hat{v}T_{4\sigma,L_0 250} = BIAS + 4\sqrt{MSE_{L_0=250}} \approx 6 \cdot 10^{-4} \end{cases}$$

The scheme adopted for the amplitude estimation (DA Fine Amplitude error Estimation block) is based on the Non Coherent Post Detection Integration (NCPDI) method as described in [R7]. It is a data-aided algorithm (the modulation is wiped out by multiplying the signal by the complex-conjugated reference symbols sequence $\{a_{0,k}\}$) and it is based on Post Detection Integration (PDI) technique which foresees a coherent integration over a subsequence of length N to increase the SNIR before applying non-linear processing. A coherent accumulation over M PDI estimates with $M=L_0/N$ is then performed to further average out the noise plus interference.

The non linearity, as described above, is needed at this stage of the recovery chain since the phase is still unknown; instead the sizing of N and M depends on the residual frequency error not completely neglected by the previous blocks. In fact, the presence of a residual frequency error determines energy degradation after coherent accumulation over N symbols. The values N=50 and M=5 have been adopted as trade-off between estimation accuracy (the larger N, the lower MSE) and estimation precision (the lower N, the lower the energy degradation due to the frequency error).

Two possible solutions have been envisaged for the DA Fine Phase Error Recovery block:
  Closed-loop (PLL) scheme, recommended when single frequency recovery strategy is applied thanks to the following key features:
    Low complexity
    Simplify the Frequency recovery scheme
    More sensitive to parameter setting
  Feed-Forward (FF) scheme, possible when double frequency recovery strategy is applied thanks to the following key features:
    Only low residual frequency errors are accepted
    Slightly better performances
    Easier design (no need for parameter tuning)

Hereafter only the FF solution is considered, implicitly underlying the usage of double frequency recovery strategy.

Phase estimation is based on a maximum likelihood (ML) data-aided estimator and exploits all symbols in the burst. The estimate is then applied to correct all the burst symbols, including the ramp-up. Due to possible frequency error not completely neglected by the previous blocks, only the mid-burst phase is perfectly recovered whereas the maximum phase error will be experienced at the extremity.

As it will be shown later, the maximum tolerable residual phase error has been experimentally estimated in $\pm 0.03 \times 2\pi$. Under this assumption and taking into account the estimate statistics derived through simulation (bias and MSE), all the symbols in the burst will be properly phase-shifted within the expected range with a probability higher than 97%. Equivalently, considering only the phase error impact, the entire burst will be cancelled with a probability higher than 97% with a residual power below the target threshold.

Timing estimation is also based on a maximum-likelihood (ML) approach.

The final target of the Digital Re-Modulator is the cancellation of the successfully decoded message by subtracting it off the received signal. The signal is digitally re-modulated and subtracted off the composite signal received in the TDMA slot under analysis.

The signal is then re-processed by the receiver to "extract" further messages; the process can be successful only if the first decoded signal, nominally the most powerful within the zonal-demodulator bandwidth, is properly cancelled out with a residual power (due to a non ideal cancellation) low enough not to interfere with other signals.

The target is to reduce the (normalized) residual signal power after cancellation down to −25/−30 dB. Under this hypothesis, the residual power will be under the noise floor in most of the cases.

In order to derive reference target values for the design and parameter tuning of the Frequency, Phase and Amplitude estimation blocks, a sensitivity analysis of the residual power to the phase and amplitude residual errors have been derived. Taking into account the previously discussed threshold (−25/−30 dB), it can be shown that an amplitude estimation error between ±0.3 dB and a phase estimation error between ±0.03×2π are still acceptable.

It is worthwhile to mention that also when these conditions are not met a second message could be still successfully decoded even if with a lower probability.

The same considerations can be extended to consider also the not perfect sampling time. The impact of this error has been evaluated in terms of reduced power cancelled out in the range of interest, nominally ±0.3 dB for the amplitude estimate, ±0.03×2π for the phase estimate. A sampling time error of 1/(8 Rb) corresponds, in a worst case scenario, to a reduction of cancelled power of 8 dB, and an error of 1/(16 Rb) to a reduction of 4 dB. Equivalently the residual power after cancellation is in the order of roughly 20 dB and 25 dB respectively.

As discussed above, a standard deviation of less then 0.1/Rb is regarded as low enough for the zonal-demodulator performance point of view. Assuming a Gaussian distribution, this residual uncertainty can be easily translated in a probability of 84% for a target error of 1/16 Rb, and 97% for a target error of 1/8 Rb.

When this is regarded as not sufficient, an additional block to refine the clock estimate can be introduced, as illustrated on FIG. 14.

Figure 16A:
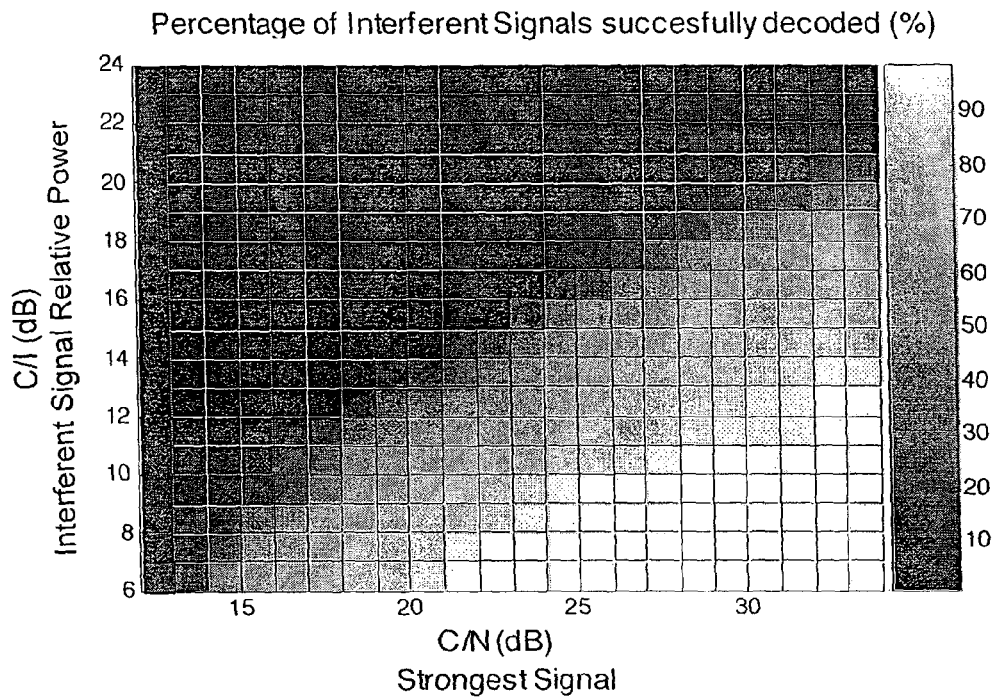
Figure 16B:
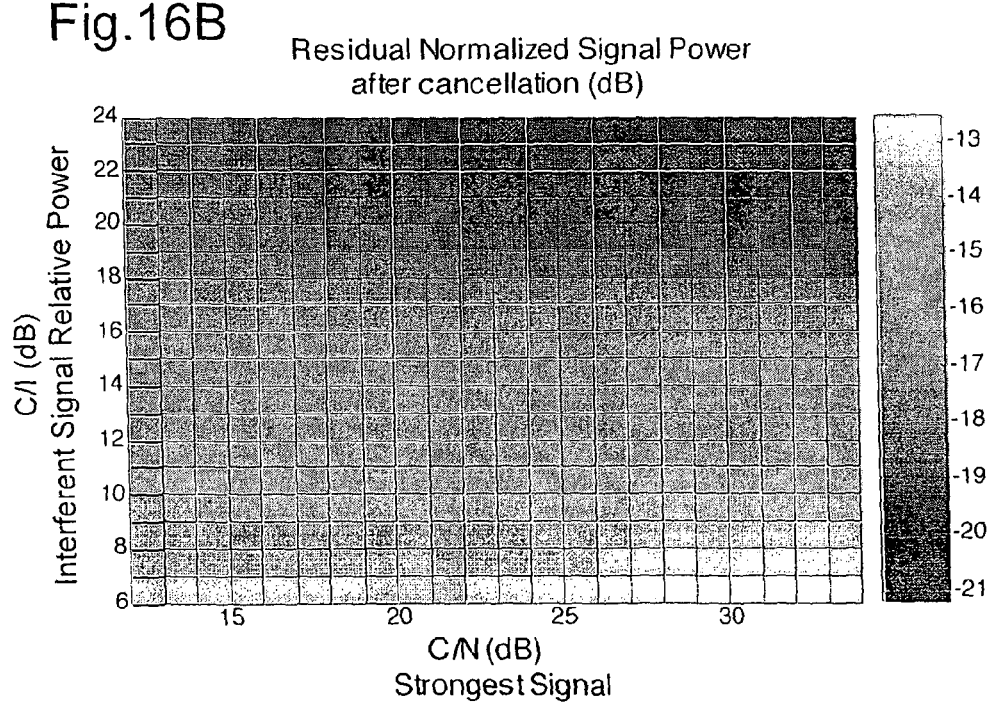

The performances of the proposed re-modulation and interference cancellation illustrated on FIG. 14 and described in the previous paragraphs have been checked against different condition in terms of C/N of the most powerful signal in the TDMA slot and C/I (FIGS. 16A and 16B). In order to reduce the number of cases to be tested, only one interfering signal has been considered.

The results have been then reported in two different graphics:

FIG. 16A illustrates the percentage of interfering signals successfully decoded: after cancellation of the first signal.

FIG. 16B illustrates the residual normalized signal power of the first signal after its cancellation More in detail, the carrier-to-noise ratio (C/N) of the single interfering signal can be then easily derived as function of C/I.

From this, it is clear that for some cases (i.e. {C/N=20 dB, C/I=20 dB}), the decoding cannot be successful even in case of perfect signal cancellation.

Figure 17:
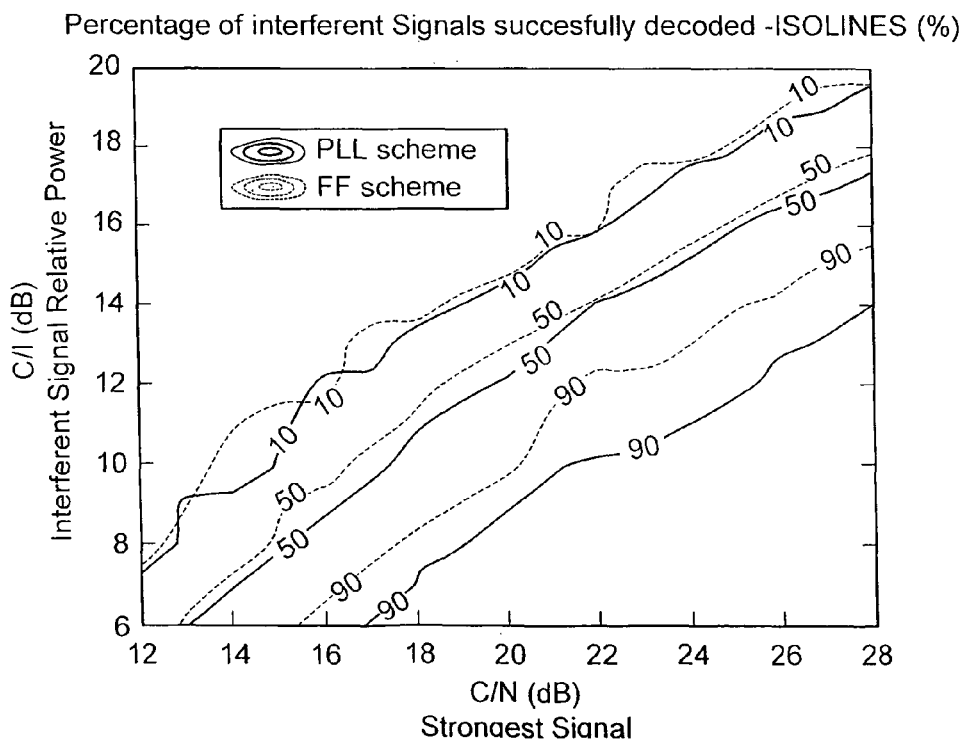
FIGS. 16A, 16B and 17, plots illustrating the performances of interference cancellation in the framework of the invention.

As it can easily understood and clearly appears also in FIG. 17 (dashed line), it can be concluded that there is a higher probability to decode successfully the interfering signal with high link-margin (C/N) and relatively low C/I margin. A more accurate signal cancellation occurs with high link-margin (C/N) and high C/I margin.

Also, in FIG. 17 results for both PLL (full line) and FF (dashed line) phase recovery schemes at different link-budget margin for the strongest signal (C/N) and interfering signal relative power (C/I). In this case, only iso-lines have been reported to make the reading easier.

In regions with low percentages of successful decoding of the interfering signal (<50%), the schemes can be considered equivalent. In regions with high percentages of successful decoding FF scheme overcomes the PLL approach: up to 2 dB at 90% in C/N.

REFERENCES

[R1] James E. Hicks, James S. Clark, Jeffrey Stocker, Gregory S. Mitchell, Peter Wyckoff, "AIS/GMSK Receiver on FPGA Platform for Satellite Application", Proc. of SPIE Vol. 5819 (SPIE, Bellingham, Wash., 2005)

[R2] G. Colavolpe and R. Raheli, "Noncoherent Sequence Detection of Continuous Phase Modulations", IEEE Transactions on Comms, Vol. 47, No. 9, September 1999

[R3] M. Morelli and U. Mengali, "Joint Frequency and Timing Recovery for MSK-Type Modulation", IEEE Trans. On Comms, Vol. 47, No. 6, June 1999

[R4] U. Mengali and A. N. D'Andrea, 'Synchronization Techniques for Digital Receivers', Plenum Press, New York, 1997

[R5] U. Mengali and M. Morelli, 'Decomposition of M-ary CPM signals into PAM waveforms', EEE Transactions on Information Theory, vol. 41, No. 5, September 1995, pp. 1265-1275

[R6] M. Luise, R. Reggiannini, 'Carrier Frequency Recovery in All-Digital Modem for Burst-Mode Transmissions', IEEE Transactions On Communications, Vol. 43, No. 2/3/4 February 1995

[R7] G. E. Corazza, and R. Pedone, "Generalized and Average Post Detection Integration Methods for Code Acquisition", IEEE International Symposium on Spread Spectrum Techniques and Applications (ISSSTA04), Sydney, Australia, 30 Aug.-2 Sep. 2004.

The invention claimed is:

1. An Automatic Identification System (AIS) receiver comprising at least one processing section for demodulating and detecting AIS messages contained in a received signal propagating along a main signal path, wherein the receiver is configured to carry processing steps separately for a plurality of frequency sub-bands spanning an AIS channel, said sub-bands overlapping with each others; and in that said or each processing section is configured for demodulating and detecting said AIS messages within each sub-band on the basis of estimations of the timing and carrier frequency of said received AIS signal, said estimation being obtained from filtered replicas of said received signal, propagating along respective auxiliary signal paths parallel to said main signal path.

2. The Automatic Identification System (AIS) receiver according to claim 1 wherein said processing section comprises a bank of parallel demodulators, each of said demodulators being configured for demodulating and detecting said AIS messages within one respective sub-band.

3. The Automatic Identification System (AIS) receiver according to claim 1 wherein said processing section comprises a single demodulator configured for demodulating and detecting said AIS messages successively for a plurality of said sub-bands.

4. The Automatic Identification System (AIS) receiver according to claim 2, wherein said or each demodulator comprises a synchronization block having an auxiliary signal path parallel to a main signal path, wherein:

said auxiliary signal path comprises a filter for extracting one of said sub-bands from a replica of the signal to be processed; and processing means for obtaining timing and frequency estimations from the filtered replica;

said main signal path comprises means for synchronizing and converting to base-band the signal to be processed by using said timing and frequency estimations;

and wherein no filter for isolating one said sub-band is provided on said main signal path.

5. The Automatic Identification System (AIS) receiver according to claim 1, wherein each of said sub-bands has a bandwidth equivalent to the bit-rate of said AIS messages, plus or minus 5%.

6. The Automatic Identification System (AIS) receiver according to claim 5, wherein the distance between the centers of two adjacent sub-bands is 0.3 times the bit-rate of said AIS messages, plus or minus 10%.

7. The Automatic Identification System (AIS) receiver according to claim 6, wherein three sub-bands span the whole AIS channel.

8. The Automatic Identification System (AIS) receiver according to claim 1, wherein the overlap of two adjacent sub-bands is at least equal to the separation of their central frequencies.

9. The Automatic Identification System (AIS) receiver according to claim 1, wherein said synchronization block is configured to obtain said timing and frequency estimations from an AIS message having Continuous Phase Modulation by a non-data-aided feed-forward algorithm.

10. The Automatic Identification System (AIS) receiver according to claim 1 wherein each or said demodulator comprises a detection block for detecting demodulated AIS messages by a non-coherent sequence detection algorithm.

11. The Automatic Identification System (AIS) receiver according to claim 1 wherein each or said demodulator further comprises a frame synchronizing block for determining the timing of a TDMA frame of a detected AIS message by performing sliding-window cyclic redundancy check.

12. The Automatic Identification System (AIS) receiver according to claim 1, further comprising a message parser (MP) for identifying AIS messages which have been correctly detected in more than one sub-band and discarding replicas thereof.

13. The Automatic Identification System (AIS) receiver according to claim 1 further comprising:

an input buffer for storing a set of samples of said received signal at the input of said processing section;

a re-modulating block for re-modulating the detected AIS messages with the help of available timing and carrier frequency estimation; and interference cancellation means for subtracting said re-modulated AIS messages from the samples stored in said input buffer.

14. The Automatic Identification System (AIS) receiver according to claim 13 wherein said re-modulating block comprises means for performing data-aided fine frequency estimation.

15. The Automatic Identification System (AIS) receiver according to claim 1 comprising two said processing sections for demodulating and detecting AIS messages contained in a first and a second AIS channels.

16. The Automatic Identification System (AIS) receiver according to claim 1 further comprising a front-end section for receiving, pre-processing and digitizing a signal comprising a plurality of AIS messages, and for providing said digitized signal to said processing section.

17. A satellite telecommunication payload comprising an Automatic Identification System (AIS) receiver according to claim 16, said payload being adapted for receiving and detecting AIS messages generated by uncoordinated AIS emitters spread over an area having a radius greater or equal than 1,000 nautical miles.

* * * * *